(12) United States Patent
Ano

(10) Patent No.: US 10,761,624 B2
(45) Date of Patent: Sep. 1, 2020

(54) DISPLAY APPARATUS AND METHOD FOR CONTROLLING DISPLAY APPARATUS

(71) Applicant: SEIKO EPSON CORPORATION, Tokyo (JP)

(72) Inventor: Takahiro Ano, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 101 days.

(21) Appl. No.: 16/032,174

(22) Filed: Jul. 11, 2018

(65) Prior Publication Data

US 2019/0033985 A1  Jan. 31, 2019

(30) Foreign Application Priority Data

Jul. 26, 2017  (JP) .................. 2017-144738

(51) Int. Cl.
| | |
|---|---|
| G03B 21/14 | (2006.01) |
| G06F 3/038 | (2013.01) |
| G06F 3/03 | (2006.01) |
| G03B 37/04 | (2006.01) |

(52) U.S. Cl.
CPC ............ G06F 3/038 (2013.01); G03B 21/14 (2013.01); G03B 37/04 (2013.01); G06F 3/0304 (2013.01); *G03B 2206/00* (2013.01)

(58) Field of Classification Search
CPC ...... G03B 21/14; G03B 21/26; G03B 21/142; G03B 21/147; G06F 3/04; G06F 3/038; G06F 3/0304; G06F 3/03542; G06F 3/0425; G06F 3/1446; H04N 9/3147; H04N 9/3185; H04N 9/3194
See application file for complete search history.

(56) References Cited

U.S. PATENT DOCUMENTS

| | | | |
|---|---|---|---|
| 9,524,574 B2 | 12/2016 | Ota et al. | |
| 2006/0181686 A1* | 8/2006 | Matsuda | G03B 21/14 353/69 |
| 2009/0207185 A1* | 8/2009 | Furui | H04N 9/3185 345/619 |
| 2010/0182234 A1* | 7/2010 | Takahashi | G03B 21/14 345/157 |

(Continued)

FOREIGN PATENT DOCUMENTS

JP  2013-247486 A  12/2013

*Primary Examiner* — Sultan Chowdhury
(74) *Attorney, Agent, or Firm* — Oliff PLC

(57) ABSTRACT

A projector including an imaging section that detects operation performed on a screen, a coordinate calculating section that calculates position information representing the position in a display area where the operation detected by the imaging section has been performed, and a control section that produces a drawn object based on the position information calculated by the coordinate calculating section and causes both the produced drawn object and a partial image to be displayed in the display area, and the control section switches the operation mode of the display apparatus between a first operation mode in which the position information is transmitted to another projector via a USB I/F section and a second operation mode in which the position information is converted into image position information representing the position in an image displayed on the screen and causes the display apparatus to operate in the selected mode.

8 Claims, 7 Drawing Sheets

(56) References Cited

U.S. PATENT DOCUMENTS

2013/0314439 A1    11/2013  Ota et al.
2015/0237317 A1*   8/2015   Ehara .................. H04N 9/3185
                                                        348/745
2016/0191877 A1*   6/2016   Ono .................... H04N 9/3185
                                                        348/744

* cited by examiner

DISPLAY APPARATUS AND METHOD FOR CONTROLLING DISPLAY APPARATUS

CROSS-REFERENCE

The entire disclosure of Japanese Patent Application No. 2017-144738, filed Jul. 26, 2017 is expressly incorporated by reference herein.

BACKGROUND

1. Technical Field

The present invention relates to a display apparatus and a method for controlling the display apparatus.

2. Related Art

There has been a known display apparatus having a drawing mode in which operation performed on a display surface is detected and an image corresponding to the detected operation is displayed on the display surface and a notification mode in which position information representing the position where the detected operation was performed is transmitted to an external apparatus (see JP-A-2013-247486, for example).

In the case where the operation mode of the display apparatus is the notification mode, and the display apparatus is carrying out a process based on the information on the position where the detected operation was performed, it undesirably takes time before the external apparatus is notified of the position information.

SUMMARY

An advantage of some aspects of the invention is to shorten the period required for a display apparatus to notify another display apparatus of position information in correspondence with the operation mode of the display apparatus.

An aspect of the invention is directed to a display apparatus that displays an image on a display surface, the display apparatus including a connection section that connects the display apparatus to another display apparatus, a display section that displays a partial image that forms at least part of the image in a first display area of the display surface, a detection section that detects operation performed on the display surface with a pointing element, a position information generating section that generates position information representing a position in the first display area where the operation detected by the detection section has been performed, and a control section that produces a drawn object based on the position information generated by the position information generating section and causes the display section to display both the produced drawn object and the partial image in the first display area. The control section switches an operation mode of the display apparatus between a first operation mode in which the position information is transmitted to the other display apparatus via the connection section and a second operation mode in which the position information is converted into image position information representing a position in the image displayed on the display surface and causes the display apparatus to operate in the selected mode, and the position information is transmitted from the position information generating section to the connection section in the first operation mode.

According to the aspect of the invention, the control section switches the first operation mode, in which the position information is transmitted to the other display apparatus, to the second operation mode, in which the position information is converted into image position information representing the position in the image displayed on the display surface, or switches the second operation mode to the first operation mode and causes the display apparatus to operate in the selected mode. In the case where the operation mode of the display apparatus is the first operation mode, the position information is transmitted from the position information generating section to the connection section. Therefore, since switching the operation mode to the first operation mode allows the position information produced by the position information generating section to be transmitted to the connection section, the period required to input the position information to the connection section can be shortened, whereby a delay that occurs in the transmission of the position information can be suppressed.

In the aspect of the invention, the display apparatus may further include a first path that connects the position information generating section to the connection section, a second path that connects the position information generating section to an input side of the control section and connects an output side of the control section to the connection section, and a switch circuit that sets a path that connects the position information generating section to the connection section to be the first or second path, and the control section may cause the switch circuit to set the path to be the first path in a case where the operation mode is the first operation mode.

According to the aspect of the invention with this configuration, the switch circuit sets the path to be the first path in the case where the operation mode is the first operation mode. The position information is therefore transmitted from the position information generating section to the connection section without passing through the control section, whereby a delay that occurs in the transmission of the position information can be suppressed.

In the aspect of the invention, the control section may cause the switch circuit to set the path to be the second path in a case where the operation mode is the second operation mode, and when the control section receives, from the other display apparatus, the position information representing an operation position in a second display area where the other display apparatus displays the partial image on the display surface, the control section may convert the received position information into the image position information.

According to the aspect of the invention with this configuration, in the case where the operation mode is the second operation mode, the position information received from the other display apparatus is converted into the image position information. The operation position in the second display area can therefore be converted into the position in a whole image displayed on the display surface, whereby the position where the operation has been performed on the whole image can be determined.

According to the aspect of the invention, the control section may convert the position information into the image position information based on information representing a range of the first display area, information representing a range of the second display area, and a positional relationship between the first display area and the second display area on the display surface.

According to the aspect of the invention with this configuration, the operation position in the second display area can be precisely converted into the position in the whole image displayed on the display surface.

In the aspect of the invention, the control section may switch the operation mode to the first or second operation mode based on a positional relationship between the first display area and the second display area on the display surface.

According to the aspect of the invention with this configuration, the operation mode is switched to the first or second operation mode based on the positional relationship between the display areas where images are displayed. Time and effort of switching the operation mode of each of the display apparatus and the other display apparatus can therefore be saved.

In the aspect of the invention, the connection section may include a first connection section that connects the display apparatus to a first display apparatus as the other display apparatus and a second connection section that connects the display apparatus to a second display apparatus as the other display apparatus, the display apparatus may include a third path that connects the first connection section to the second connection section, a fourth path that connects the first connection section to an input side of the control section and connects an output side of the control section to the second connection section, and a switch circuit that sets a path that connects the first connection section to the second connection section to be the third or fourth path, and the control section may cause the switch circuit to set the path to be the third path and transmits information received from the first display apparatus to the second connection section along the third path in a case where the operation mode is the first operation mode.

According to the aspect of the invention with this configuration, the information received from the first display apparatus is transmitted from the first connection section to the second connection section without passing through the control section, whereby a delay that occurs in the information transmission can be suppressed.

In the aspect of the invention, the connection section may connect the display apparatus to an image supplying apparatus that supplies the display apparatus with image data, and the control section may transmit the produced image position information to the image supplying apparatus in the second operation mode.

According to the aspect of the invention with this configuration, in the case where the operation mode is the second operation mode, the produced image position information is transmitted to the image supplying apparatus. The image supplying apparatus can therefore determine the position where the operation has been performed on the image.

In the aspect of the invention, the control section may produce the drawn object based on the position information generated based on the operation detected by the detection section, switch a drawing mode in which the display section displays the produced drawn object along with the partial image in the first display area to an operation notification mode in which the position information is transmitted to the other display apparatus or switches the operation notification mode to the drawing mode, and causes the display apparatus to operate in the selected mode.

According to the aspect of the invention with this configuration, the display apparatus can switch the operation mode between the drawing mode and the operation notification mode and operate in the selected mode.

Another aspect of the invention is directed to a method for controlling a display apparatus including a connection section that connects the display apparatus to another display apparatus, a display section that displays a partial image that forms at least part of an image displayed on a display surface in a first display area of the display surface, a detection section that detects operation performed on the display surface with a pointing element, and a position information generating section that generates position information representing a position in the first display area where the operation detected by the detection section has been performed, the display apparatus and the other display apparatus connected thereto displaying an image on the display surface, the method including switching a first process of transmitting the position information generated by the position information generating section to the other display apparatus via the connection section to a second process of converting the position information into image position information representing a position in the image displayed on the display surface or switching the second process to the first process and carrying out the selected process, and transmitting the position information from the position information generating section to the connection section in the first process.

According to the aspect of the invention, the first process of transmitting the position information to the other display apparatus is switched to the second process of converting the position information into image position information representing the position in the image displayed on the display surface, or the second operation mode is switched to the first operation mode, and the selected process is carried out. The position information is transmitted from the position information generating section to the connection section in the first process. Therefore, since carrying out the first process allows the position information produced by the position information generating section to be transmitted to the connection section, the period required to input the position information to the connection section can be shortened, whereby a delay that occurs in the transmission of the position information can be suppressed.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
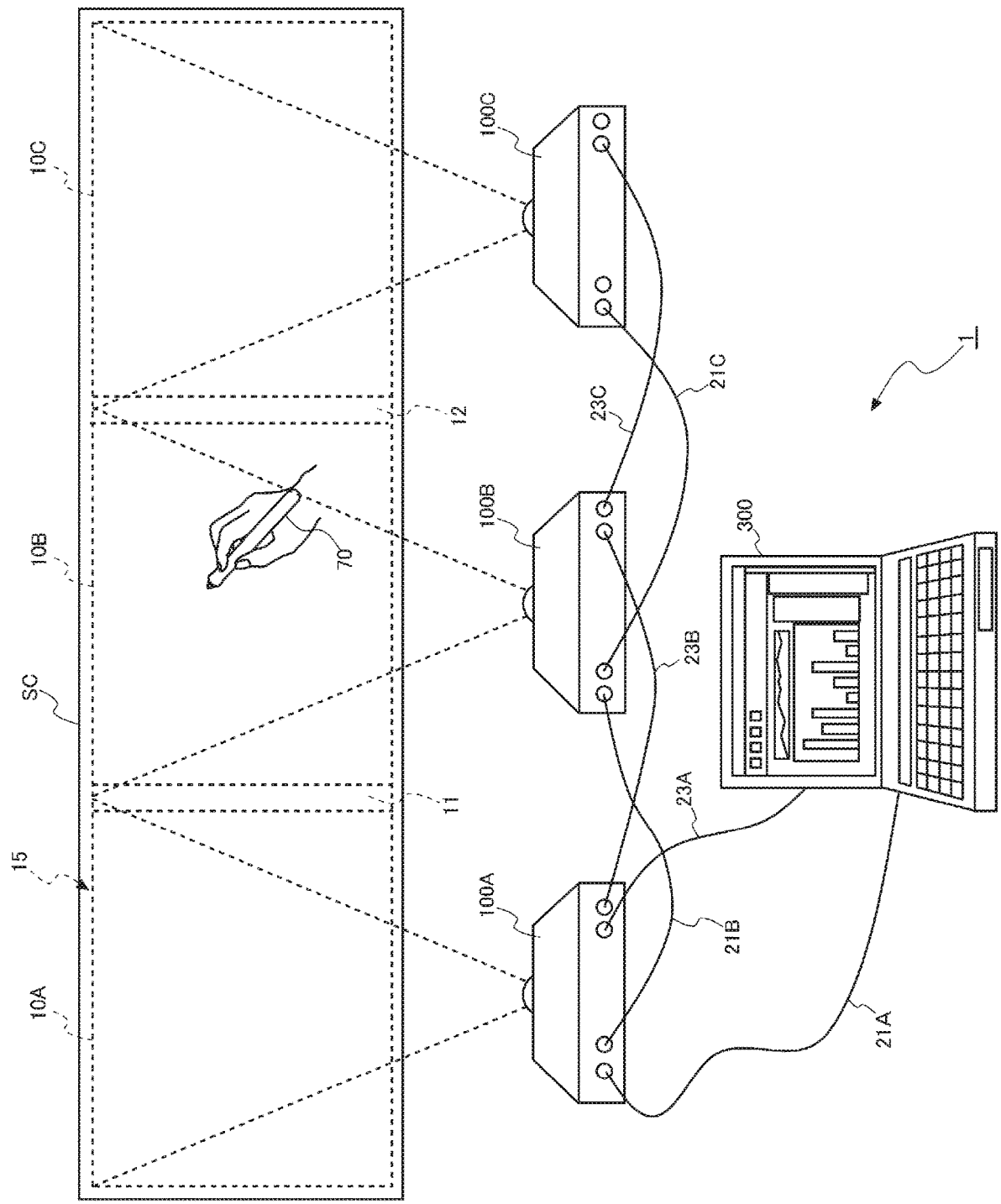
FIG. 1 is a system configuration diagram of a projection system.

FIG. 1 is a system configuration diagram of a projection system 1 as an embodiment of the invention.

The projection system 1 includes a plurality of projectors 100 and an image supplying apparatus 300. FIG. 1 shows three projectors 100A, 100B, and 100C as the plurality of projectors 100, but the number of projectors 100 is not limited to three and may instead be two or four or greater. In the following description, in a case where the projectors 100A, 100B, and 100C do not particularly need to be distinguished from one another, they are called projectors 100.

The projectors 100 each process image data supplied from the image supplying apparatus 300 and project an image on a display surface. The following description will be made of a case where the display surface is a screen SC, but the display surface may be a curved surface, a discontinuous surface, an irregular surface, or any other surface. Specifically, the display surface can be a wall surface of a building or a surface of an object.

The projectors 100A, 100B, and 100C are connected to the image supplying apparatus 300 in the form of daisy chain connection via image (video) cables. The image (video) cables can, for example, each be a cable compliant with MHL (registered trademark), HDMI (registered trademark), or DisplayPort (trademark). In the present embodiment, the projector 100A is connected to the downstream side of the image supplying apparatus 300, the projector 100B is connected to the downstream side of the projector 100A, and the projector 100C is connected to the downstream side of the projector 100B.

The following description will be made with reference to a case where the image (video) cables are each an HDMI cable. The image supplying apparatus 300 and the projector 100A are connected to each other via an HDMI cable 21A. The projector 100A and the projector 100B are connected to each other via an HDMI cable 21B. The projector 100B and the projector 100C are connected to each other via an HDMI cable 21C.

The projectors 100 and the image supplying apparatus 300 are further connected to each other via data communication cables compliant with Ethernet (registered trademark), IEEE 1394, USB, or any other standard. The present embodiment will be described with reference to a case where the data communication cables are each a USB cable.

The image supplying apparatus 300 and the projector 100A are connected to each other via a USB cable 23A. The projector 100A and the projector 100B are connected to each other via a USB cable 23B. The projector 100B and the projector 100C are connected to each other via a USB cable 23C.

The image supplying apparatus 300 transmits an HDMI signal to the projector 100A via the HDMI cable 21A. The projector 100A, when it receives the HDMI signal from the image supplying apparatus 300, transmits the received HDMI signal to the downstream projector 100B via the HDMI cable 21B. Similarly, the projector 100B, when it receives the HDMI signal from the projector 100A, transmits the received HDMI signal to the downstream projector 100C via the HDMI cable 21C.

The HDMI signal contains image data. The image data may be motion image data or a still image data. The HDMI signal may further contain voice data. The voice data may be monaural voice data or stereo voice data.

The image supplying apparatus 300 can, for example, be a notebook personal computer (PC), a desktop PC, a tablet terminal, a smartphone, a personal digital assistant (PDA). The image supplying apparatus 300 may instead be a video reproducing apparatus, a digital versatile disk (DVD) player, a Blu-ray disc player, a hard disk recorder, a TV tuner, a set-top box of a cable television (CATV), a video game console, or any other apparatus.

The image supplying apparatus 300 transmits a control signal to the projector 100A via a Consumer Electronics Control (CEC) line contained in the USB cable 23A or the HDMI cable 21A. The control signal contains arrangement information. The arrangement information contains, for example, the number of connected projectors 100, the connection topology, information on the projector 100 located in the head position, a counter, and other pieces of information.

The number of connected projectors 100 is information representing the number of projectors 100 connected to each other in the daisy chain connection. In the projection system 1 in the present embodiment, the information on the number of connected projectors 100 is "3".

The connection topology is information representing how the plurality of projectors 100 are connected to each other, for example, a horizontal single-line arrangement, a vertical single-line arrangement, or an N-row-by-M-column arrangement. The information on the projector 100 located in the head position is information for identification of the projector 100A connected to the image supplying apparatus 300 and information representing the position of the projector 100A in the projection system 1. In the present embodiment, the position of the projector 100A is "left." For example, in the case where the plurality of projectors 100 are connected to each other in the N-row-by-M-column arrangement, the information on the position of the projector 100 located in the head position is, for example, "first row and first column."

The counter is information for determining the order in accordance with which the projectors 100 are connected to each other in the daisy chain connection. The projector 100A connected to the image supplying apparatus 300 is a first projector, that is, the projector 100 located in the head position, and the projector 100B connected to the projector 100A is a second projector in the connection order. The projector 100C connected to the projector 100B is a third projector in the connection order.

For example, the image supplying apparatus 300 transmits arrangement information containing the counter having a value set at "0" to the projector 100A. The projector 100A determines that the projector 100A is the first projector in the connection order because the value of the counter contained in the received arrangement information is "0". The projector 100A adds "1" to the value of the counter and outputs the arrangement information containing the counter to the downstream projector 100B. The projector 100B determines that the projector 100B is the second projector in the connection order because the value of the counter contained in the received arrangement information is "1". The projector 100B adds "1" to the value of the counter and outputs the arrangement information containing the counter to the downstream projector 100C. The projector 100C determines that the projector 100C is the third projector in the connection order because the value of the counter contained in the received arrangement information is "2".

A control signal transmitted from the projector 100A to the image supplying apparatus 300 contains, for example, coordinate information representing the position where operation has been performed. The coordinate information is information representing the position where an operator performs operation on the screen SC by using a pointing element 70. The pointing element 70 is, for example, a pen-type device having a rod-shaped shaft. The operation and the coordinate information will be described later in detail.

FIG. 1 shows a case where the projectors 100A, 100B, and 100C are installed on a flat surface along a single line parallel to the lateral direction of the screen SC so that the projectors 100 project laterally arranged images on the screen SC. The installation of the projectors 100A to 100C is not limited to the flat surface installation and can instead be hanging installation in which the projectors 100A to 100C are hung from a ceiling or wall mounting installation in which the projectors 100A to 100C are mounted on a wall surface. The projectors 100A to 100C may still instead be installed along a vertical single line, or in case where a greater number of projectors 100 are connected to each other, the projectors 100 may be arranged in a matrix having N vertically arranged rows and M horizontally arranged columns (N and M are each arbitrary natural number).

The projectors 100A, 100B, and 100C project images in divided display areas that form the screen SC. The projector 100A projects an image in a display area 10A, which is the left area of the screen SC when viewed along the direction toward the plane of view of FIG. 1. The projector 100B projects an image in a display area 10B, which is the central area of the screen SC when viewed along the direction toward the plane of view of FIG. 1. The projector 100C projects an image in a display area 10C, which is the right area of the screen SC when viewed along the direction toward the plane of view of FIG. 1. In the following description, in a case where the display areas 10A, 10B, and 10C are collectively called, they are called display areas 10. Further, the display area formed of the display areas 10A, 10B, and 10C is called a display area 15.

The projection system 1 in the present embodiment performs tiling projection. In the tiling projection, the plurality of projectors 100 project images on the screen SC, and the images projected by the projectors 100 are combined with each other on the screen SC. Combining the images with each other on the screen SC means that the projectors 100 are so arranged that the images projected therefrom are serially disposed on the screen SC and the projectors 100 project the images in synchronization with one another to display a single large-screen image on the screen SC. The image projected on the screen SC in the tiling projection is called a whole image.

In the tiling projection, projectors 100 adjacent to each other project images in such a way that edge portions of the projected images overlap with each other to make the boundary between the projected images less visible. For example, an image projected by the projector 100A and an image projected by the projector 100B, which is located on the right of the projector 100A, form an overlapping area 11, where the edge portions of the images overlap with each other. Similarly, the image projected by the projector 100B and an image projected by the projector 100C, which is located on the right of the projector 100B, form an overlapping area 12, where the edge portions of the images overlap with each other.

To perform the tiling projection, the image data is divided into a plurality of sets of image data, and the projectors 100A to 100C project the divided sets of image data. The image data division may be performed by the image supplying apparatus 300, the projector 100A, which is the first projector in the connection order, or each of the projectors 100.

For example, the case where the projector 100A divides the image data will be described. In this case, the projector 100A stores information representing the positions and ranges of the display areas 10A, 10B, and 10C, where the projectors 100A, 100B, and 100C display images. The operator may operate a remote control 5 or any other component to input the information to the projector 100A, or the projectors 100 may produce the information based on calibration before the image projection.

The calibration is performed, for example, in the following procedure: The projectors 100A, 100B, and 100C each first project a predetermined image (entirely black image, for example, hereinafter referred to as calibration image) on the screen SC. When the calibration image is projected in each of the display areas 10A, 10B, and 10C of the screen SC, an imaging section 181B of the projector 100B, which is located at the center, captures an image of the entire screen SC. The imaging section 181B has an imaging range (angle of view) that allows an image of the entire screen SC to be captured. The imaging section 181B captures an image over the imaging range with visible light in the calibration.

Thereafter, only the projector 100A projects the calibration image in the display area 10A of the screen SC, and the imaging section 181B of the projector 100B captures an image of the screen SC. Similarly, only the projector 100B projects the calibration image in the display area 10B of the screen SC, and the imaging section 181B of the projector 100B captures an image of the screen SC. Further, only the projector 100C projects the calibration image in the display area 10C of the screen SC, and the imaging section 181B of the projector 100B captures an image of the screen SC.

A control section 150B of the projector 100B acquires captured image data produced by the imaging section 181B. The control section 150B detects the calibration image capture ranges from the acquired captured image data and produces information representing the size of the display area 15 and the ranges and positions of the display areas 10A to 10C. The control section 150B of the projector 100B transmits the produced information representing the size of the display area 15 and the ranges and positions of the display areas 10A to 10C to the projector 100A. The projector 100A causes a storage 137A to store the information received from the projector 100B as position/range information 213A (see FIG. 3).

The projector 100A, when it receives the HDMI signal from the image supplying apparatus 300, processes the received HDMI signal and extracts the image data. The projector 100A divides the extracted image data based on the position/range information 213A to produce image data sets to be displayed by the projectors 100A to 100C. The image data sets into which the image data is divided are called divided image data sets. The projector 100A transmits the divided image data set to be displayed in the display area 10B and the divided image data set to be displayed in the display area 10C to the projector 100B. The projector 100B extracts the divided image data set to be displayed in the display area 10C out of the divided image data sets received from the projector 100A and transmits the divided image data set to be displayed in the display area 10C to the projector 100C.

Figure 2:
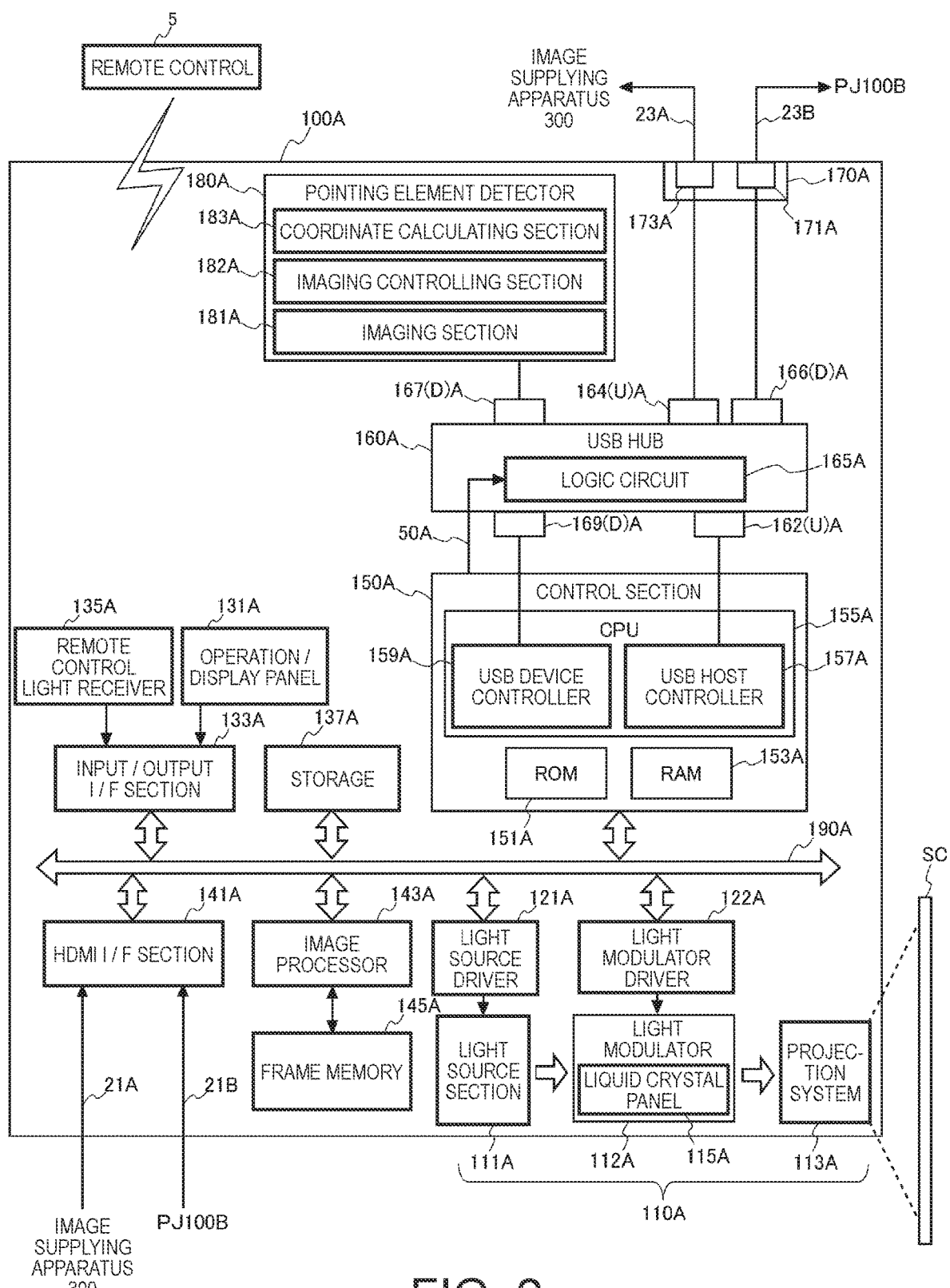
FIG. 2 is a configuration diagram showing the configuration of a projector.

FIG. 2 is a configuration diagram showing the configuration of the projector 100A.

The projectors 100A, 100B, and 100C have roughly the same configuration. The configuration of the projector 100A will therefore be representatively described, and no description will be made of the other projectors 100B and 100C. In the following description, to distinguish the configurations of the projectors 100 from one another, the name of each component of the projector 100A has a suffix "A", and the name of each component of the projector 100B has a suffix "B". Similarly, the name of each component of the projector 100C has a suffix "C" in the description. For example, reference character 150A denotes the control section of the projector 100A, reference character 150B denotes the control section of the projector 100B, and reference character 150C denotes the control section of the projector 100C.

The projector 100A includes an HDMI I/F section 141A.

The HDMI I/F section 141A includes a receiver, a transmitter, and an interface circuit (none of them is shown). The receiver is connected to the image supplying apparatus 300 via the HDMI cable 21A and receives the HDMI signal transmitted from the image supplying apparatus 300. The interface circuit processes the HDMI signal received by the receiver to extract image data and control information. The interface circuit outputs the extracted image data to the control section 150A and an image processor 143A. The interface circuit further outputs the extracted control information to the control section 150A.

The transmitter is connected to the projector 100B via the HDMI cable 21B. The interface circuit performs encoding, serial conversion, and other types of processing on the divided image data set inputted from the control section 150A to produce an HDMI signal and outputs the produced HDMI signal to the transmitter. The transmitter transmits the HDMI signal inputted from the interface circuit to the projector 100B.

The projector 100A includes a projection section 110A, which forms an optical image and projects the image on the screen SC. The projection section 110A includes a light source section 111A, a light modulator 112A, and a projection system 113A. The projection section 110A corresponds to the "display section" in an aspect of the invention.

The light source section 111A includes a light source. The light source can, for example, be a xenon lamp, an ultrahigh-pressure mercury lamp, a light emitting diode (LED), or a laser light source. The light source section 111A may further include a reflector and an auxiliary reflector that guide light emitted by the light source to the light modulator 112A. The light source section 111A may further include a lens group for enhancing the optical characteristics of projected light, a polarizer, a light adjusting element that is disposed in the path leading to the light modulator 112A and attenuates the amount of the light emitted by the light source, or any other component (none of the components described above is shown).

The light source section 111A is driven by a light source driver 121A. The light source driver 121A is connected to a bus 190A and turns on and off the light source section 111A under the control of the control section 150A, which is also connected to the bus 190A.

The light modulator 112A includes three liquid crystal panels 115A corresponding, for example, to the three primary colors of light, R (red), G (green), and B (blue). That is, the light modulator 112A includes a liquid crystal panel 115A corresponding to R (red) light, a liquid crystal panel 115A corresponding to G (green) light, and a liquid crystal panel 115A corresponding to B (blue) light. The light outputted by the light source section 111A is separated into RGB three color light fluxes and incident on the corresponding liquid crystal panels 115A. The three liquid crystal panels 115A are each a transmissive liquid crystal panel and modulate light passing therethrough to produce image light. The modulated image light fluxes having passed through the liquid crystal panels 115A are combined with one another by a light combining system, such as a cross dichroic prism, and the combined light is directed to the projection system 113A.

The light modulator 112A is driven by a light modulator driver 122A. The light modulator driver 122A is connected to the bus 190A.

The light modulator driver 122A receives, as inputs, image data on a color basis or RGB image data sets from the image processor 143A. The light modulator driver 122A produces drive voltages that drive the liquid crystal panels 115A based on the input image data sets. The light modulator driver 122A applies voltages to the pixels of the liquid crystal panels 115A based on the produces drive voltages to draw images on the liquid crystal panels 115A.

The projection system 113A includes a lens group that projects the modulated image light fluxes from the light modulator 112A onto the screen SC to form an image on the screen SC. The projection system 113A may further include a zoom mechanism that enlarges or reduces the image projected on the screen SC and a focus adjustment mechanism that adjusts focusing.

The projector 100A includes an operation/display panel 131A, an input/output I/F section 133A, and a remote control light receiver 135A. The operation/display panel 131A and the remote control light receiver 135A are connected to the input/output I/F section 133A, which is connected to be bus 190A.

The operation/display panel 131A, which functions as a user interface, is provided with a variety of operation keys, a display panel using an LCD (liquid crystal panel), and other components. The input/output I/F section 133A causes the display panel of the operation/display panel 131A to display a variety of screens based on a signal inputted from the control section 150A.

The operation/display panel 131A is further provided with a variety of operation keys, such as a power key for powering on and off the projector 100A and a menu key for making a variety of settings. When any of the operation keys is operated, the input/output I/F section 133A outputs an operation signal corresponding to the operated key to the control section 150A.

The projector 100A further includes the remote control 5 used by the user. The remote control 5 includes a variety of buttons and outputs an infrared signal in correspondence with operation performed on any of the buttons.

The remote control light receiver 135A receives the infrared signal transmitted from the remote control 5. The input/output I/F section 133A decodes the infrared signal received by the remote control light receiver 135A to produce an operation signal representing the content of the operation performed on the remote control 5 and outputs the operation signal to the control section 150A.

The projector 100A includes an image processing system. The image processing system is primarily formed of the control section 150A, which oversees and controls the entire projector 100A. The image processing system further includes the image processor 143A, a frame memory 145A, and the storage 137A. The control section 150A, the image processor 143A, and the storage 137A are connected to each other via the bus 190A in a data communicable manner.

The image processor 143A develops the image data, which has been received by the HDMI I/F section 141A, in the frame memory 145A and processes the developed image data. Examples of the processes carried out by the image processor 143A include a resolution conversion (scaling) process or a resizing process, a shape correction process, such as distortion correction, a digital zooming process, a color tone correction process, and a luminance correction process. The image processor 143A carries out a process specified by the control section 150A. The image processor 143A carries out the process by using a parameter inputted from the control section 150A as required. The image processor 143A can, of course, carry out the combination of a plurality of the processes described above. The image processor 143A reads image data having undergone the process from the frame memory 145A and outputs the image data to the light modulator driver 122A.

The storage 137A is an auxiliary storage device, for example, a hard disk drive. The storage 137A may be replaced with a dynamic RAM (DRAM) or a device that allows large-capacity information storage, such as a flash memory and an optical disk including a compact disc (CD), a digital versatile disc (DVD), and a Blu-ray (registered trademark) disc (BD). The data stored in the storage 137A will be described in detail with reference to FIG. 3.

The control section 150A includes a ROM 151A, a RAM 153A, a CPU 155A or any other processor, and other peripheral circuits (not shown) and controls each portion of the projector 100A. The control section 150A may include a plurality of processors.

The ROM 151A is a nonvolatile memory, such as a flash ROM, and stores a control program and data. The RAM 153A is used as a work area when the CPU 155A carries out computation processes. The CPU 155A reads the control program from the ROM 151A or the storage 137A, develops the control program in the RAM 153A, and executes the developed control program to control each portion of the projector 100A.

The present embodiment will be described with reference to a case where the control section 150A, the light source driver 121A, the light modulator driver 122A, the input/output I/F section 133A, and the image processor 143A are each configured as individual hardware. As a configuration different from the configuration in the present embodiment, the CPU 155A may perform the functions of the light source driver 121A, the light modulator driver 122A, the input/output I/F section 133A, and the image processor 143A. A single CPU (or semiconductor ship) may perform the functions of the control section 150A (or the functions of the light source driver 121A, the light modulator driver 122A, the input/output I/F section 133A, the image processor 143A, and other components in addition to the functions of the control section 150A), or a plurality of CPUs (or semiconductor chips) may perform the functions described above.

The CPU 155A includes a USB host controller 157A and a USB device controller 159A as hardware.

The USB host controller 157A is a controller for communication compliant with the USB standard with a USB device. The USB host controller 157A causes the projector 100A to operate as a USB host. The USB device controller 159A is a controller for communication compliant with the USB standard with the USB host. The USB device controller 159A causes the projector 100A to operate as a USB device.

The projector 100A further includes a USB hub 160A, a USB I/F section 170A, and a pointing element detector 180A. The USB I/F section 170A corresponds to the connection section in an aspect of the invention.

The USB hub 160A switches the destination to which the USB I/F section 170A and the pointing element detector 180A are connected under the control of the control section 150A.

The USB hub 160A includes a plurality of upstream ports 162(U)A and 164(U)A, a plurality of downstream ports 166(D)A, 167(D)A, and 169(D)A, and a logic circuit 165A. In the following description, reference characters with (U) denote the upstream ports, and reference characters with (D) denote the downstream ports. The logic circuit 165 corresponds to the "switch circuit" in an aspect of the invention.

The upstream ports 162(U)A and 164(U)A are ports connected to the USB host. The upstream port 162(U)A is connected to the USB host controller 157A. The upstream port 164(U)A is connected to the image supplying apparatus 300 via a USB port 173A of the USB I/F section 170A. The image supplying apparatus 300 operates as the USB host in relation to the projector 100A, and the projector 100A operates as a USB device in relation to the image supplying apparatus 300.

The downstream ports 166(D)A, 167(D)A, and 169(D)A are ports connected to a USB device.

The downstream port 166(D)A is connected to the projector 100B via a USB port 171A of the USB I/F section 170A. The projector 100A operates as the USB host in relation to the projector 100B, and the projector 100B operates as a USB device in relation to the projector 100A.

The downstream port 167(D)A is connected to the pointing element detector 180A. The downstream port 169(D)A is connected to the USB device controller 159A.

The logic circuit 165A is connected to the control section 150A via a control signal line 50A. The logic circuit 165A switches the connection between the upstream ports 162(U)A, 164(U)A and the downstream ports 166(D)A, 167(D)A, and 169(D)A under the control of the control section 150A. The logic circuit 165A further detects connection and disconnection of a USB device, connects and disconnects the USB host to and from a USB device, detects a bus error (fault), and eliminates the bus error for recovery of normal operation.

The pointing element detector 180A includes an imaging section 181A, an imaging controlling section 182A, and a coordinate calculating section 183A and detects operation performed on the screen SC with the pointing element 70. The imaging section 181A corresponds to the "detection section" of an aspect of the invention. The coordinate calculating section 183A corresponds to the "position information generating section" of an aspect of the invention.

The pointing element 70 will first be described before the pointing element detector 180A is described.

The pointing element 70 includes a power supply, such as a dry battery and a secondary battery, a light emitter including a light emitting diode that emits infrared light, and a switch that is turned on when the tip of the pointing element 70 comes into contact with an object (screen, for example) and turned off when the tip is separate from the object (none of the components of the pointing element 70 is shown). When the operator operates the pointing element 70 to cause the tip thereof to come into contact with the screen SC, the switch is turned on, and the light emitting diode emits infrared light in a light emission pattern different from the light emission pattern in the case where the switch is turned off.

Examples of the operation detected with the pointing element detector 180A include operation of causing the tip of the pointing element 70 to be in contact with the screen SC in an arbitrary position for a fixed period and operation of causing the tip of the pointing element 70 to move with the tip being in contact with the screen SC to continuously point different positions on the screen SC.

When the pointing element detector 180A detects the position on the screen SC where the tip of the pointing element 70 is in contact therewith, for example, a button in a toolbar displayed on the screen SC by the projector 100A can be selected. Further, when the pointing element detector 180A detects motion of the pointing element 70 on the screen SC, a drawing function of drawing a letter, a symbol, or a figure corresponding to the motion of the pointing element 70 on the screen SC is performed.

The imaging section 181A captures an image over a range containing the screen SC and therearound to produce a captured image. The imaging section 181A includes an infrared imaging device that captures infrared light and an interface circuit and performs infrared imaging. The imaging section 181A further includes an imaging device that performs visible light imaging and an interface circuit and can also perform visible light imaging. The imaging device can be a CCD or a CMOS device and can even be a device other than a CCD or a CMOS device. The imaging direction of the imaging section 181A coincides or roughly coincides with the projection direction of the projection system 113A, and the imaging range (angle of view) of the imaging section 181A includes the range over which the projection system 113A projects an image on the screen SC. The imaging section 181A outputs captured image data.

To detect operation performed with the pointing element 70, the imaging controlling section 182A causes the imaging section 181A to perform the infrared imaging under the control of the control section 150A. The imaging controlling section 182A acquires the captured image data captured by the imaging section 181A. The captured image data produced when the imaging section 181A captures the infrared light contains an image formed by the infrared light emitted by the pointing element 70. The imaging controlling section 182A detects the infrared image contained in the captured image data to detect the coordinates of the position where the operation has been performed with the pointing element 70.

The coordinate calculating section 183A converts the coordinates of the operation position into the coordinates in the display area 10A and outputs coordinate information representing the converted coordinates. The coordinates of the operation position detected by the imaging controlling section 182A are the coordinates in the captured image data. The coordinate calculating section 183A calculates the coordinates of the operation position in the display area 10A of the screen SC from the coordinates of the operation position in the captured image data based on the result of the calibration performed in advance. In the calibration, a predetermined calibration image is projected via the projection section 110A onto the screen SC, and the imaging section 181A captures the displayed calibration image. The relationship between the coordinates in the captured image data and the coordinates in the display area 10A of the screen SC (coordinate conversion parameter) is derived based on the calibration image captured by the imaging section 181A.

Figure 3:
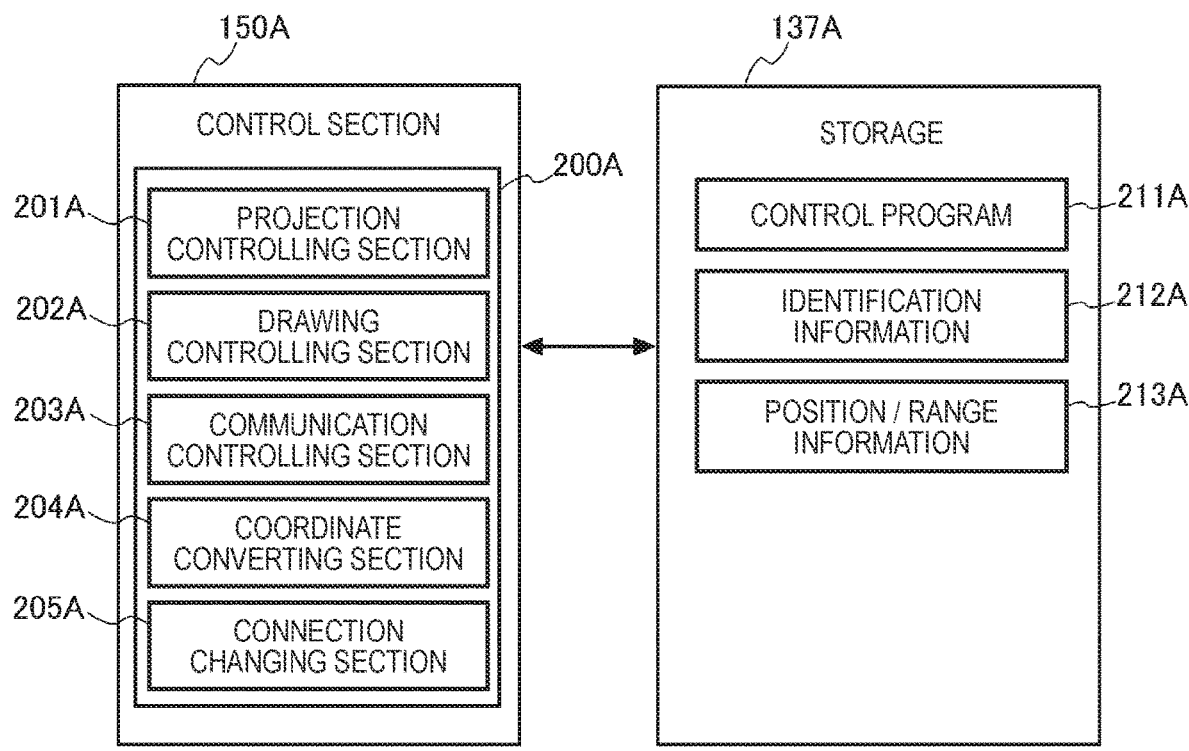
FIG. 3 shows a control section of the projector and data stored in a storage.

FIG. 3 shows functional blocks provided in the control section 150A and data stored in the storage 137A.

The data stored in the storage 137A will first be described. The storage 137A stores a control program 211A executed by the CPU 155A, identification information 212A for identification of each of the projectors 100, and the position/range information 213A. The identification information 212A is, for example, added to each of the divided image data sets. The projector 100B, when it receives the divided image data sets from the projector 100A, evaluates whether each of the divided image data sets is the data directed to the projector 100B or the data directed to the projector 100C based on the identification information added to the divided image data sets. The position/range information 213A is used to calculate the coordinates in a whole coordinate system that will be described later. The whole coordinate system will be described later in detail.

The control section 150A includes a projection controlling section 201A, a drawing controlling section 202A, a communication controlling section 203A, a coordinate converting section 204A, and a connection changing section 205A as the functional blocks. The functional blocks represent functions achieved when the CPU 155A carries out computation processes in accordance with the control program for convenience in the form of blocks and do not each stand for a specific application or hardware. The control section 150A may achieve the functions indicated by the functional blocks by a plurality of processors.

The projection controlling section 201A controls some portions of the projector 100A to cause the portions to display an image in the display area 10A of the screen SC. Specifically, the projection controlling section 201A controls the light modulator driver 122A to cause it to draw images based on the image data in the liquid crystal panels 115A. The projection controlling section 201A further controls the light source driver 121A to cause it to turn on and off the light source in the light source section 111A and adjust the luminance of the light emitted from the light source.

The drawing controlling section 202A operates when the operation mode of the projector 100A is a drawing mode.

The projectors 100A, 100B, and 100C each have a drawing mode and a mouse mode as the operation mode. The mouse mode corresponds to the "operation notification mode" in an aspect of the invention. The drawing mode is a mode in which any of the projectors 100 detects operation performed with the pointing element 70 and the projector 100 having detected the operation carries out a process corresponding to the detected operation. The mouse mode is a mode in which any of the projectors 100 detects operation performed with the pointing element 70 and an external apparatus is notified of coordinate information representing the position where the detected operation has been performed. The external apparatus notified of the coordinate information is an apparatus that operates as the USB host in the USB connection and is a high-level apparatus in the daisy chain connection. That is, the projector 100C notifies the projector 100B of the coordinate information, the projector 100B notifies the projector 100A of the coordinate information, and the projector 100A notifies the image supplying apparatus 300 of the coordinate information. Further, the projector 100B, when it receives the coordinate information from the projector 100C, transmits the received coordinate information to the projector 100A.

The drawing controlling section 202A links the coordinates indicated by the coordinate information inputted from the pointing element detector 180A to each other to detect the trajectory of the operation performed with the pointing element 70. The drawing controlling section 202A produces drawing data according to the detected operation trajectory. The drawing data is, for example, data representing a letter, a symbol, a line, a figure, or an image and corresponds to the "drawn object" in an aspect of the invention. The drawing controlling section 202A outputs the produced drawing data to the image processor 143A. The image processor 143A develops the drawing data in the frame memory 145A in which the image data extracted from the HDMI signal has been developed to produce combined image data. The image processor 143A outputs the produced combined image data to the light modulator driver 122A. The light modulator driver 122A produces drive voltages that drive the liquid crystal panels 115A based on the combined image data inputted from the image processor 143A. The light modulator driver 122A applies voltages to the pixels of each of the liquid crystal panels 115A to draw an image on the liquid crystal panel 115A. The images drawn on the liquid crystal panels 115A are thus displayed in the display area 10A via the projection system 113A.

In a case where the coordinates indicated by the coordinate information remain the same or roughly the same continuously for multiple times, the drawing controlling section 202A determines that operation of selecting the coordinates indicated by the coordinate information has been inputted. In this case, the drawing controlling section 202A evaluate whether or not the coordinates indicated by the coordinate information are coordinates in the area where the toolbar is displayed. In a case where the coordinates indicated by the coordinate information are those in the area where the toolbar is displayed, the drawing controlling section 202A identifies a toolbar button displayed in the coordinates indicated by the coordinate information and performs the function set in relation to the identified button. The toolbar is provided, for example, with buttons corresponding to the function of deleting and saving the drawing data displayed in the display area 10A and the function of changing the linewidth and color of the drawn object drawn with the pointing element 70.

The communication controlling section 203A controls communication with the image supplying apparatus 300, which is an apparatus having a level higher than the level of the projector 100A and communication with the projector 100B having a level lower than the level of the projector 100A.

The projectors 100A, 100B, and 100C each have two operation modes as the action in the mouse mode, a first operation mode and a second operation mode.

The first operation mode is an operation mode executed in a case where a projector 100 has a connection order other than the first connection order, that is, the second or third connection order in the daisy chain connection. The second operation mode is an operation mode executed in a case where a projector 100 has the first connection order in the daisy chain connection.

The coordinate information detected by the pointing element detector 180A or the coordinate information detected by the projector 100B or 100C is inputted to the coordinate converting section 204A of the projector 100A that operates in the second operation mode. The coordinate converting section 204A converts the coordinates indicated by the inputted coordinate information into the coordinates in the display area 15, which is formed of the entire display areas 10A, 10B, and 10C. The coordinate system set in the display area 15 is hereinafter referred to as a whole coordinate system. The coordinate converting section 204A converts the coordinates of each of the display areas 10A, 10B, and 10C into the coordinates representing the position in the whole image projected on the screen SC in the tiling projection. Coordinates in the whole coordinate system correspond to the image position information in an aspect of the invention.

The whole coordinate system is, for example, a coordinate system having an origin located at the upper left corner of the display area 10A, which is located at the left end. The vertical range of the whole coordinate system is so set as to be equal to the vertical range of the display area 10A. The horizontal range of the whole coordinate system is set based on the ranges of the display areas 10A, 10B, and 10C. That is, the overlapping area 11 is formed along the boundary between the display area 10A and the display area 10B, and the overlapping area 12 is formed along the boundary between the display area 10B and the display area 10C. The horizontal range of the display area 10A includes the overlapping area 11, the horizontal range of the display area 10B includes the overlapping areas 11 and 12, and the horizontal range of the display area 10C includes the overlapping area 12. When coordinate information in the display area 10B or 10C is inputted to the coordinate converting section 204A as the coordinate information, the coordinate converting section 204A converts the inputted coordinates into the coordinates in the whole coordinate system.

The storage 137A of the projector 100A stores the position/range information 213A, which represents the positions and ranges of the display areas 10A, 10B, and 10C. The coordinate converting section 204A converts coordinates in any of the display areas 10A, 10B, and 10C into the coordinates in the whole coordinate system based on the position/range information 213A. Having calculated the coordinates representing the position where operation has been performed with the pointing element 70, the coordinate converting section 204A outputs the calculated coordinates to the communication controlling section 203A. The communication controlling section 203A transmits the coordinates inputted from the coordinate converting section 204A to the image supplying apparatus 300 via the USB cable 23A.

The connection changing section 205A does not operate when the operation mode of the projector 100A is the second operation mode. In the present embodiment, the connection changing sections 205B and 205C of the projectors 100B and 100C operate when the operation modes thereof are the first operation mode.

In a case where it is determined based on the arrangement information that the projector 100B does not have the first connection order, and when the operation mode of the projector 100B is changed from the drawing mode to the mouse mode or from the mouse mode to the drawing mode, the connection changing section 205B controls the logic circuit 165B to cause it to switch the connection path to another.

In a case where it is determined based on the arrangement information that the projector 100C does not have the first connection order, and when the operation mode of the projector 100C is changed from the drawing mode to the mouse mode or from the mouse mode to the drawing mode, the connection changing section 205C controls the logic circuit 165C to cause it to switch the connection path to another.

Figure 4:
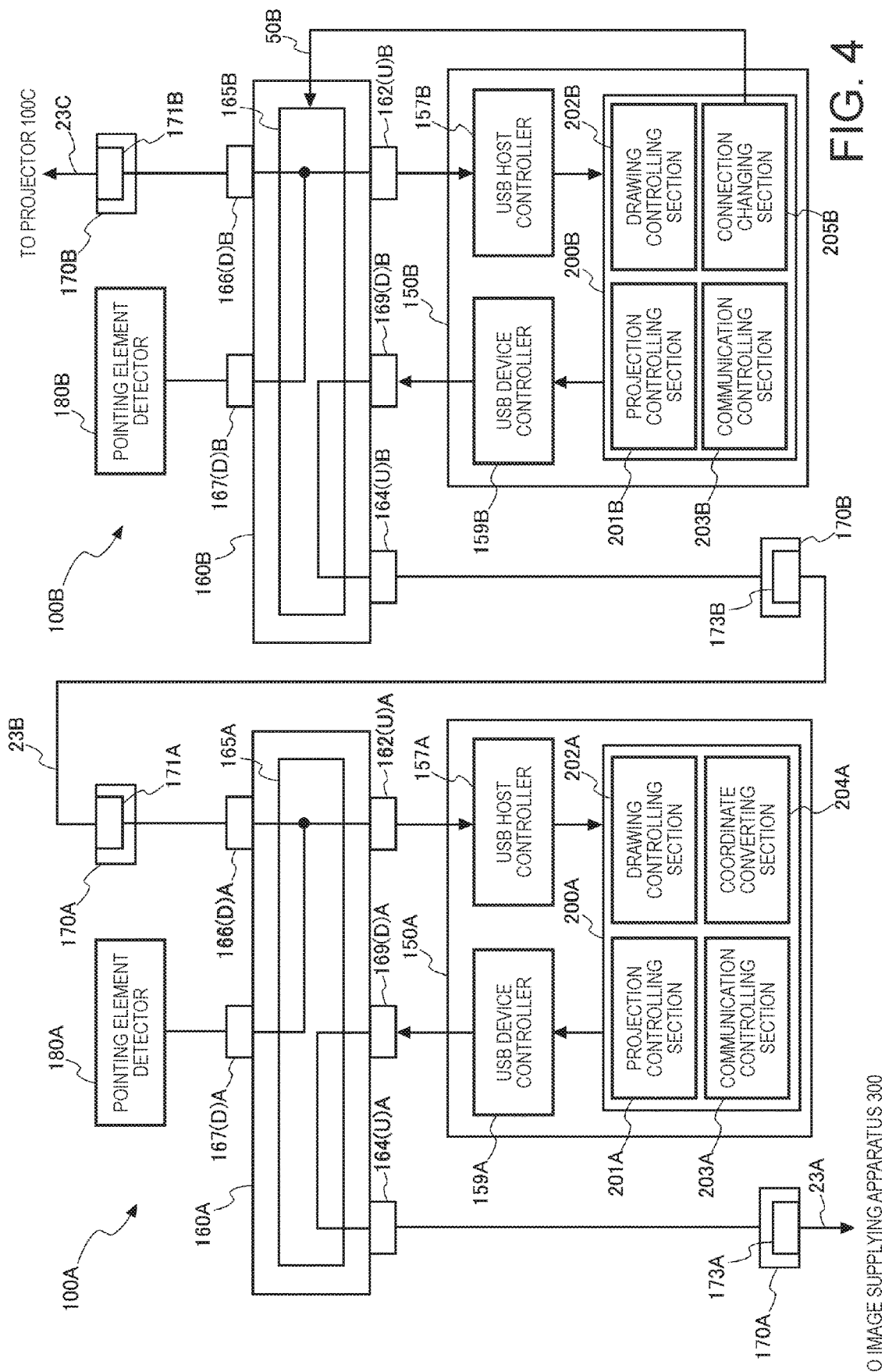
FIG. 4 shows the connection setting made by a USB hub in a drawing mode.
Figure 5:
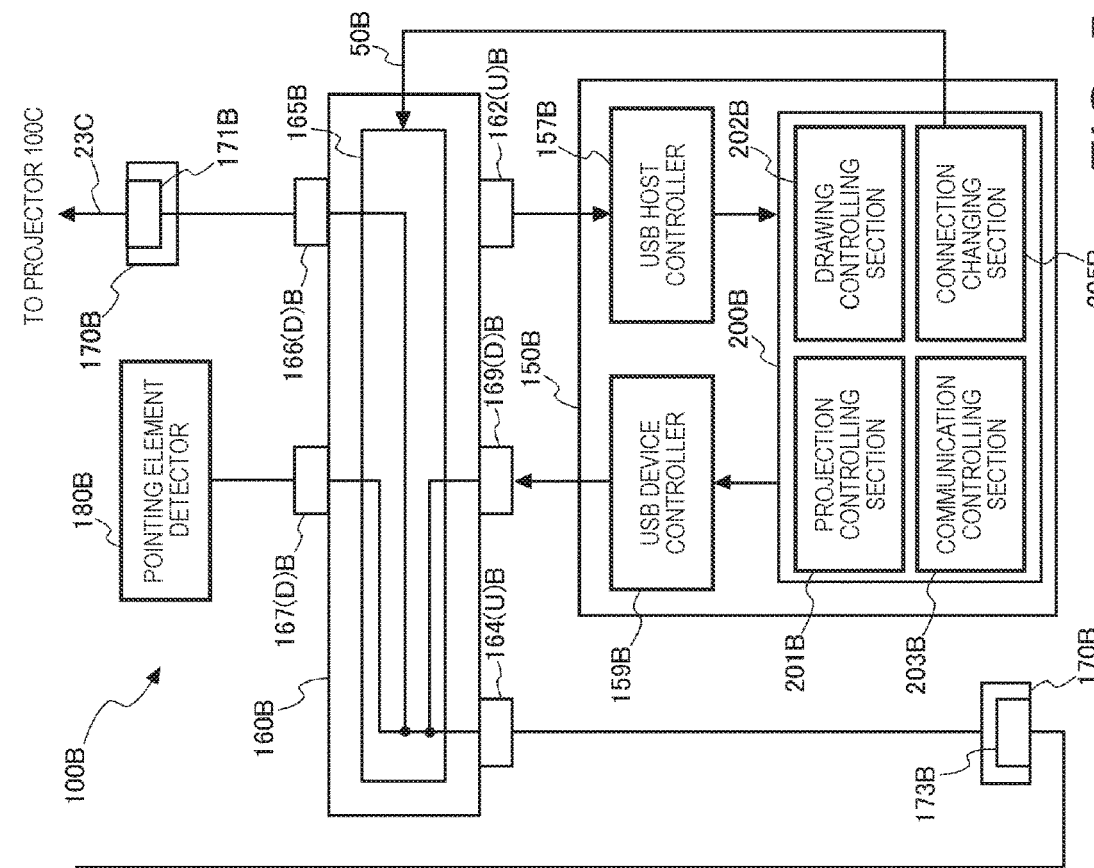
FIG. 5 shows the connection setting made by the USB hub in a mouse mode.
Figure 5:
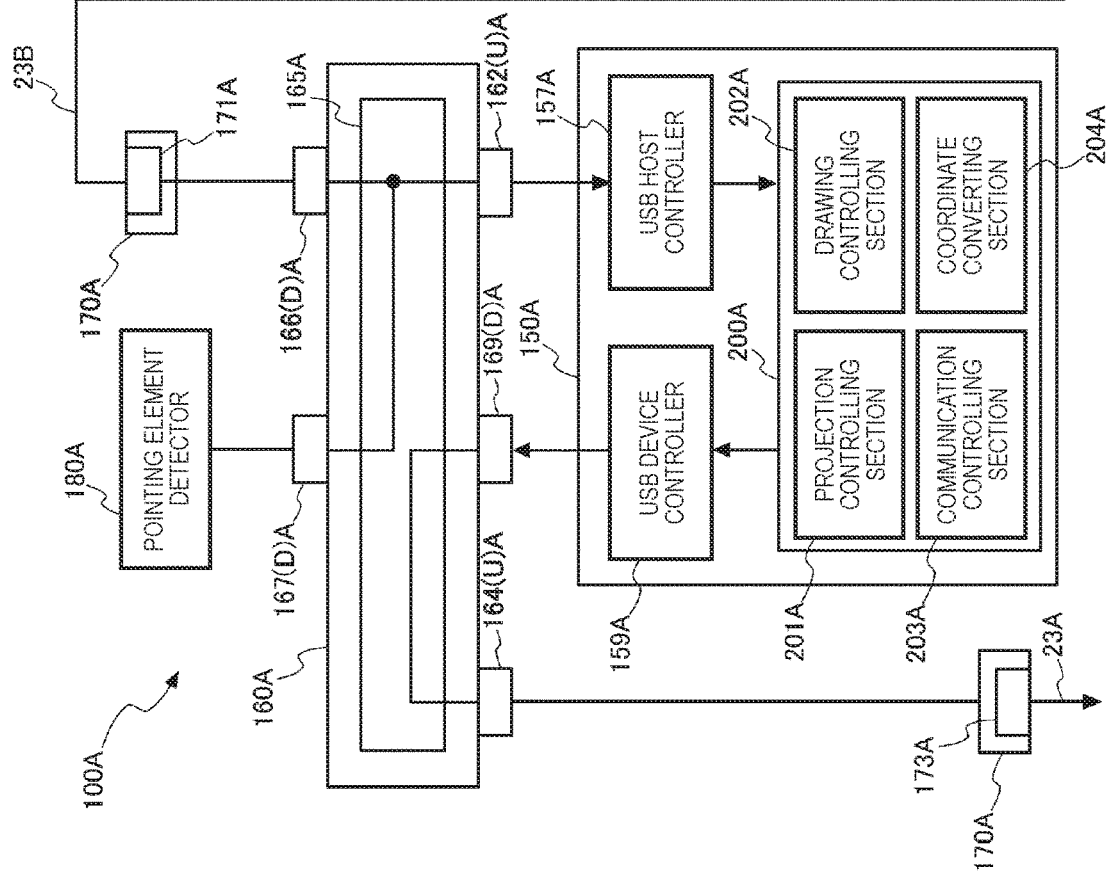

FIG. 4 shows the connection settings of the logic circuits 165A and 165B in the case where the operation mode is the drawing mode. FIG. 5 shows the connection settings of the logic circuits 165A and 165B in the case where the operation mode is the mouse mode.

FIGS. 4 and 5 show, for ease of description, both the hardware provided in the CPU 155A and a functional block 200A achieved when the CPU 155A carries out computation processes according to the control program. Similarly, FIGS. 4 and 5 show both the hardware provided in the CPU 155B and a functional block 200B achieved when the CPU 155B performs computation processes according to the control program.

The connection changing section 205A of the projector 100A does not change the connection setting of the logic circuit 165A even when the operation mode of the projector 100A is changed.

The logic circuit 165A connects the downstream ports 166(D)A and 167(D)A to the upstream port 162(U)A. The USB host controller 157A is connected to the upstream port 162(U)A, and the projector 100B is connected to the downstream port 166(D)A via the USB I/F section 170A. The pointing element detector 180A is connected to the downstream port 167(D)A. The outputs from the projector 100B and the pointing element detector 180A are therefore inputted to the control section 150A via the USB host controller 157A.

When the operation mode of the projector 100B is changed from the mouse mode to the drawing mode, the connection changing section 205B causes the logic circuit 165B to change the connection setting corresponding to the drawing mode. Specifically, the connection changing section 205B connects the downstream ports 166(D)B and 167(D)B to the upstream port 162(U)B, as shown in FIG. 4, in the case where the operation mode is the drawing mode. In the case of the connection setting described above, the outputs from the projector 100C and the pointing element detector 180B are inputted to the control section 150B via the USB host controller 157B.

The path that connects the pointing element detector 180B via the downstream port 167(D)B and the upstream port 162(U)B to the USB host controller 157B corresponds to the "second path" in an aspect of the invention. The path that connects a USB port 171B of the USB I/F section 170B, the downstream port 166(D)B, the upstream port 162(U)B, and the USB host controller 157B to each other corresponds to the "fourth path" in an aspect of the invention.

When the operation mode of the projector 100B is changed from the drawing mode to the mouse mode, the connection changing section 205B causes the logic circuit 165B to change the connection setting corresponding to the mouse mode. Specifically, the connection changing section 205B connects the downstream ports 166(D)B and 167(D)B to the upstream port 164(U)B, as shown in FIG. 5, in the case where the operation mode is the mouse mode.

In the case of the connection setting described above, the outputs from the projector 100C and the pointing element detector 180B are outputted to the projector 100A without passing through the control section 150B of the projector 100B. That is, the projector 100C is directly connected to the projector 100A, and the pointing element detector 180B is directly connected to the projector 100A.

The path that connects the USB port 171B of the USB I/F section 170B via the downstream port 166(D)B and the upstream port 164(U)B to a USB port 173B of the USB I/F section 170B corresponds to the "third path" in an aspect of the invention. The path that connects the pointing element detector 180B via the downstream port 167(D)B and the upstream port 164(U)B to the USB port 173B of the USB I/F section 170B corresponds to the "first path" in an aspect of the invention.

Although not shown, the connection changing section 205C of the projector 100C also changes the connection setting of the logic circuit 165C in accordance with the operation mode of the projector 100C.

Figure 6:
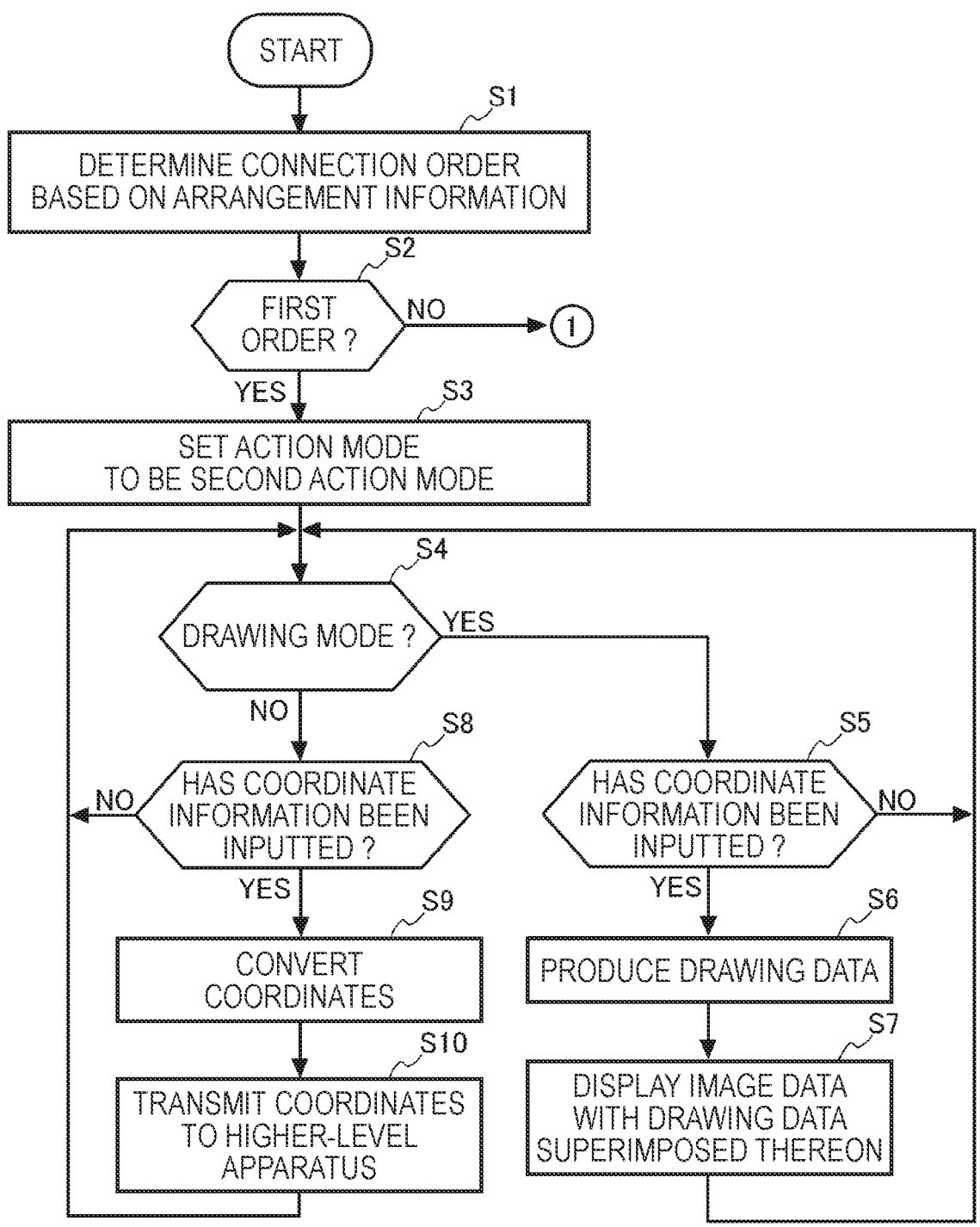
FIG. 6 is a flowchart showing the action of the projector.
Figure 7:
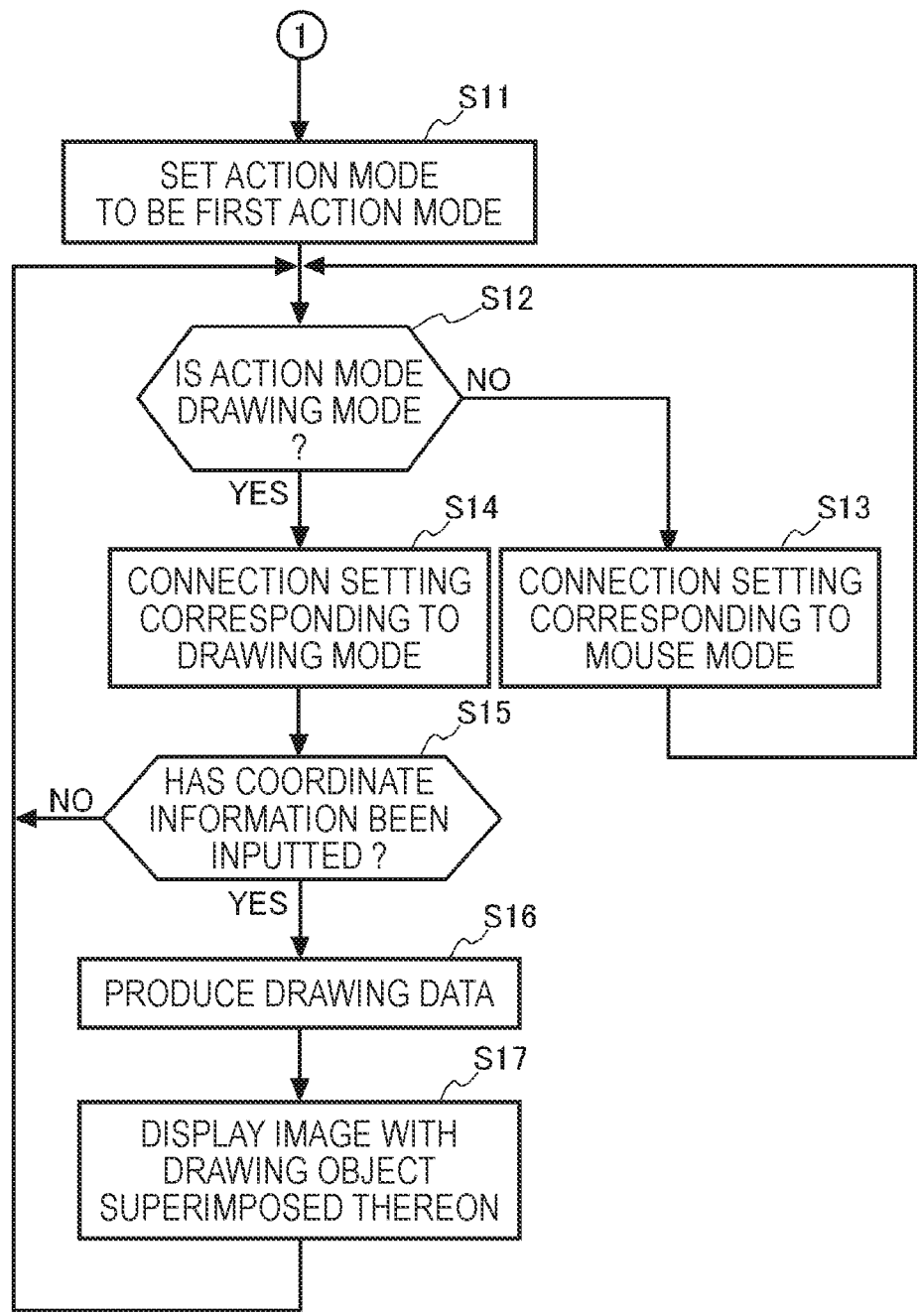
FIG. 7 is a flowchart showing the action of the projector.

FIGS. 6 and 7 are flowcharts showing the action of a projector 100. In the flowcharts, the actions of the projectors 100A, 100B, and 100C will be described as the action of a projector 100 with no distinction among the projectors 100A, 100B, and 100C.

The control section 150 of a projector 100 is connected to the other projectors 100 or the image supplying apparatus 300 via the HDMI cables 21 and the USB cables 23. The control section 150, when it receives the arrangement information transmitted from any of the other projectors 100 or the image supplying apparatus 300 connected to the projector 100 in the daisy chain connection, determines the connection order of the projector 100 in the daisy chain connection based on the received arrangement information (step S1). The control section 150 determines the connection order in the daisy chain connection based on the value of the counter contained in the arrangement information (step S1).

In a case where the projector 100 has the first connection order (YES in step S2), the control section 150 sets the operation mode to be the second operation mode (step S3). The control section 150 then evaluates whether or not the operation mode of the projector 100 is the drawing mode (step S4). In a case where the operation mode is the drawing mode (YES in step S4), the control section 150 subsequently evaluates whether or not the coordinate information has been inputted (step S5). In a case where no coordinate information has been inputted (NO in step S5), the control section 150 returns to the evaluation in step S4.

In a case where the coordinate information has been inputted (YES in step S5), the control section 150 produces drawing data based on the inputted coordinate information (step S6). The control section 150 outputs the produced drawing data to the image processor 143. The image processor 143 superimposes the inputted drawing data on the image data developed in the frame memory 145 to produce combined image data. The image processor 143 reads the produced combined image data from the frame memory 145 and outputs the combined image data to the light modulator driver 122. The light modulator driver 122 draws an image based on the inputted combined image data on the liquid crystal panel 115. The image based on the image data on which the drawing data has been superimposed is thus displayed on the screen SC (step S7).

In a case where the control section 150 determines in the evaluation in step S4 that the operation mode is not the drawing mode (NO in step S4), the control section 150 determines that the operation mode is the mouse mode and then evaluates whether or not the coordinate information has been inputted (step S8). In a case where no coordinate information has been inputted (NO in step S8), the control section 150 returns to the evaluation in step S4. In a case where the coordinate information has been inputted (YES in step S8), the control section 150 converts the coordinates indicated by the inputted coordinate information into the coordinates in the whole coordinate system (step S9). The process in step S9 corresponds to the second process in an aspect of the invention. The control section 150 transmits the converted coordinate information to a higher-level projector 100 or the image supplying apparatus 300 (step S10).

The action of the projector 100 in a case where the result of the evaluation in step S2 shows negation will next be described with reference to the flowchart shown in FIG. 7.

Having determined that the projector 100 does not have the first connection order in the daisy chain connection (No in step S2), the control section 150 sets the operation mode to be the first operation mode (step S11). The control section 150 then evaluates whether or not the operation mode of the projector 100 is the drawing mode (step S12). In a case where the control section 150 determines that the operation mode is not the drawing mode (NO in step S12), the control section 150 causes the logic circuit 165 to change the connection setting corresponding to the mouse mode (step S13). That is, the control section 150 connects the downstream ports 166(D)B and 167(D)B to the upstream port 164(U)B, as shown in FIG. 5. When the logic circuit 165 changes the connection setting corresponding to the mouse mode, the position information received from another lower-level projector is transmitted to another higher-level projector 100 without passing through the control section 150 of the projector 100. Further, the position information detected by the pointing element detector 180 is transmitted to the other higher-level projector 100 without passing through the control section 150 of the projector 100. The process of transmitting the position information to the other higher-level projector 100 corresponds to the first process in an aspect of the invention.

In a case where the control section 150 determines in the evaluation in step S12 that the operation mode is the drawing mode (YES in step S12), the control section 150 causes the logic circuit 165 to change the connection setting corresponding to the drawing mode (step S14). That is, the control section 150 connects the downstream ports 166(D)B and 167(D)B to the upstream port 162(U)B, as shown in FIG. 4. When the logic circuit 165 changes the connection setting corresponding to the drawing mode, the position information received from another lower-level projector 100 is inputted to the control section 150. Further, the position information detected by the pointing element detector 180 is inputted to the control section 150.

The control section 150 evaluates whether or not the coordinate information has been inputted (step S15). In a case where no coordinate information has been inputted (NO in step S15), the control section 150 returns to the evaluation in step S12. In a case where the coordinate information has been inputted (YES in step S15), the control section 150 produces drawing data based on the inputted coordinate information (step S16). The control section 150 then outputs the produced drawing data to the image processor 143 and causes the image processor 143 to produce combined image data. The image processor 143 reads the produced combined image data from the frame memory 145 and outputs the combined image data to the light modulator driver 122. The light modulator driver 122 draws an image based on the inputted combined image data on the liquid crystal panel 115. The image based on the image data on which the drawing data has been superimposed is thus displayed on the screen SC (step S17).

As described above, the projector 100 according to the present embodiment, along with the other projectors 100 connected to the projector 100, forms the projection system 1, which displays an image on the screen SC.

The projector 100 includes the USB I/F section 170 as the connection section, the display section 110, the pointing element detector 180 including the imaging section as the detecting section and the coordinate calculating section 183 as the position information generating section, and the control section 150 (drawing controlling section 202 and connection changing section 205).

The USB I/F section 170 connects the projector to another projector 100.

The display section 110 displays a partial image that forms at least part of an image in the display area 10 of the screen SC. The pointing element detector 180, specifically, the imaging section 181 detects operation performed on the screen SC with the pointing element 70. The pointing element detector 180, specifically, the coordinate calculating section 183 produces the coordinate information representing the position on the display area 10 where the operation detected by the imaging section 181 has been performed. The control section 150 (drawing controlling section 202) produces a drawn object based on the coordinate information produced by the pointing element detector 180 and causes the display section 110 to display the produced drawn object along with the partial image in the display area 10.

The control section 150 (connection changing section 205) switches the operation mode between the first operation mode and the second operation mode. In the first operation mode, the coordinate information produced by the pointing element detector 180 is transmitted via the USB I/F section 170 to another projector 100. In the second operation mode, the coordinate information is converted to image coordinate information representing the position in the whole image displayed on the screen SC.

Therefore, since switching the operation mode to the first operation mode allows the coordinate information produced by the pointing element detector 180 to be transmitted to the USB I/F 170, the period required to input the coordinate information to the USB I/F section 170 can be shortened, whereby a delay that occurs in the transmission of the coordinate information can be suppressed.

Further, the projector 100 has the first path, which connects the pointing element detector 180 to the USB I/F section 170, and the second path, which connects the pointing element detector 180 to the input side of the control section 150 and connects the output side of the control section 150 to the USB I/F section 170. The projector 100 further includes the logic circuit 165, which switches the path that connects the pointing element detector 180 to the USB I/F section 170 between the first path and the second path. The control section 150 causes the logic circuit 165 to set the path to be the first path in the case where the operation mode is the first operation mode.

The coordinate information is therefore transmitted from the pointing element detector 180 to the USB I/F section 170 without passing through the control section 150, whereby a delay that occurs in the transmission of the coordinate information can be suppressed.

Further, the control section 150 causes the logic circuit 165 to set the path to be the second path in the case where the operation mode is the second operation mode. The control section 150, when it receives coordinate information representing an operation position in the display area 10 where another projector 100 displays a partial image on the screen SC from the other projector 100, converts the received coordinate information into the image coordinate information.

For example, a description will be made of a case where the projector 100 corresponding to "another display apparatus" is the projector 100B and the projector 100 corresponding to "a display apparatus" is the projector 100A. In this case, the control section 150A of the projector 100A, when it receives coordinate information representing the operation position in the display area 10B, where the projector 100B displays a partial image on the screen SC, from the projector 100B, converts the received coordinate information into the image coordinate information.

The operation position in the display area 10B can therefore be converted into the position in the whole image displayed on the screen SC, whereby the position where the operation has been performed on the whole image can be determined.

Further, the control section 150A converts the coordinate information into the image coordinate information based on the information representing the range of the display area 10A, the information representing the range of the display area 10B, and the positional relationship between the display area 10A and the display area 10B on the screen SC.

The operation position in the display area 10B can therefore be precisely converted into the position in the whole image displayed on the screen SC.

The control sections 150A, 150B, and 150C of the projectors 100A, 100B, and 100C each switch the operation mode to the first or second operation mode based on the positional relationship among the display areas 10A, 10B, and 10C on the screen SC.

Time and effort of switching the operation mode of each of the projectors 100A, 100B, and 100C can therefore be saved.

The USB I/F section 170B of the projector 100B includes the USB port 171B, which is connected to the projector 100C as a first display apparatus, and the USB port 173B, which is connected to the projector 100A as a second display apparatus. The USB port 171B corresponds to the "first connection section" in an aspect of the invention. The USB port 173B corresponds to the "second connection section" in an aspect of the invention.

The projector 100B has the third path, which connects the USB port 171B to the USB port 173B, and the fourth path, which connects the USB port 171B to the input side of the control section 150B and connects the output side of the control section 150B to the USB port 173B.

When the operation mode is the first operation mode, the control section 150B causes the logic circuit 165B to set the path to be the third path and transmits information received from the projector 100C to the USB port 173B via the USB port 171B along the third path.

The information received from the projector 100C is therefore transmitted from the USB port 171B to the USB port 173B without passing through the control section 150B, whereby a delay that occurs in the information transmission can be suppressed.

The USB I/F section 170A of the projector 100A connects the projector 100A to the image supplying apparatus 300, which supplies the projector 100A with image data. The control section 150A transmits image coordinate information produced in the second operation mode to the image supplying apparatus 300.

The image supplying apparatus 300 can therefore determine the position where the operation has been performed on the image.

The control sections 150A, 150B, and 150C of the projectors 100A, 100B, and 100C each has the drawing mode and the mouse mode as the operation mode.

In the case where the operation mode of each of the projectors 100A, 100B, and 100C is the drawing mode, the control sections 150A, 150B, and 150C each produce a drawn object based on the coordinate information representing the position where detected operation has been performed. The control sections 150A, 150B, and 150C display images based on the produced drawn objects in the display areas 10A, 10B, and 10C, respectively. Further, in the case where the operation mode of each of the projectors 100A, 100B, and 100C is the drawing mode, any of the control sections 150A, 150B, and 150C transmits produced coordinate information to the corresponding one of the image supplying apparatus 300 and the projectors 100A and 100B.

The projectors 100A, 100B, and 100C can therefore each switch the operation mode between the drawing mode and the mouse mode and operate in the selected mode.

The embodiment described above is a preferable form in which the invention is implemented. The invention is, however, not limited to the embodiment described above, and a variety of changes can be made thereto to the extent that the changes do not depart from the substance of the invention.

For example, the present embodiment has been described with reference to the case where a pen-type pointing element is used as the pointing element 70, but the pointing element 70 may instead, for example, be the operator's finger or a pointing rod (not shown).

Further, in the embodiment described above, the connection order in the daisy chain connection is determined based on the value of the counter contained in the arrangement information received from a higher-level apparatus, and the operation mode of a projector 100 is switched to the first or second operation mode based on the connection order.

As an action other than that described above, the operation mode may be changed to the first or second operation mode based on the positional relationship among the display areas 10 where the projectors 100 project images. For example, the control section 150B of the projector 100B transmits the position/range information 213A determined by the calibration to the projectors 100A and 100C. The projectors 100A to 100C each change the operation mode to the first or second operation mode based on the position/range information 213A. For example, a setting can be so made in advance that the projector 100A, which projects an image in the left-end display area 10 of the screen SC, operates in the first operation mode and the other projectors 100B and 100C operate in the second operation mode.

In the embodiment described above, the configuration in which the light modulator 112A includes the liquid crystal panels 115A has been presented by way of example. Each of the liquid crystal panels 115A may be a transmissive liquid crystal panel or a reflective liquid crystal panel. The light modulator 112A may instead be formed of digital mirror devices (DMDs) in place of the liquid crystal panels 115A. The light modulator 112A may still instead be the combination of digital mirror devices and a color wheel. The light modulator 112A may instead employ a configuration in which light emitted from a light source can be modulated in place of liquid crystal panels or DMDs.

Each of the functional portions of the projector 100A shown in FIG. 2 represents a functional configuration and is not necessarily implemented in a specific form. That is, hardware corresponding to each of the functional portions is not necessarily implemented, and a single processor that executes a program can, of course, achieve the functions of the plurality of functional portions. Further, part of the functions achieved by software in the embodiment described above may be achieved by hardware, or part of the functions achieved by hardware may be achieved by software. In addition, the specific detailed configuration of each of the other portions of the projector can be arbitrarily changed to the extent that the change does not depart from the substance of the invention.

The process units in the flowcharts shown in FIGS. 6 and 7 are process units divided in accordance with the contents of the primary processes for ease of understanding of the processes carried out by a projector 100, and how to produce the divided process units or the names of the process units shown in FIGS. 6 and 7 do not limit the embodiment of the invention. A process carried out by the control section 150 can be further divided into a larger number of process units in accordance with the content of the process, and each of the process units can further be divided into a large number of processes. Further, the order in which the processes are carried out in the flowcharts described above is not limited to that shown in FIGS. 6 and 7.

In the above description, the projectors 100A, 100B, and 100C each correspond to "a display apparatus" or "another display apparatus" in an aspect of the invention. In a case where the projector 100A operates as the display apparatus, the display area 10A corresponds to the "first display area" in an aspect of the invention, and the display areas 10B and 10C each correspond to the "second display area" in an aspect of the invention. In a case where the projector 100B operates as the display apparatus, the display area 10B corresponds to the "first display area" in an aspect of the invention, and the display areas 10A and 10C each correspond to the "second display area" in an aspect of the invention. In a case where the projector 100C operates as the display apparatus, the display area 10C corresponds to the "first display area" in an aspect of the invention, and the display areas 10A and 10B each correspond to the "second display area" in an aspect of the invention.

What is claimed is:

1. A display apparatus that displays an image on a display surface, the display apparatus comprising:
a connection section that connects the display apparatus to other display apparatus;
a display section that displays a partial image that forms at least part of the image in a first display area of the display surface;
a detection section that detects an operation performed on the display surface with a pointing element;
a position information generating section that generates position information representing a position in the first display area where the operation detected by the detection section has been performed; and
a control section that produces a drawn object based on the position information generated by the position information generating section and causes the display section to display both the produced drawn object and the partial image in the first display area,
wherein the control section switches an operation mode of the display apparatus between a first operation mode in which the position information is transmitted to the other display apparatus via the connection section and a second operation mode in which the position information is converted into image position information representing a position in the image displayed on the display surface and causes the display apparatus to operate in the selected mode, and
wherein the control section produces the drawn object based on the position information generated that is based on the operation detected by the detection section, switches a drawing mode in which the display section displays the produced drawn object along with the partial image in the first display area to an operation notification mode in which the position information is transmitted to the other display apparatus or switches the operation notification mode to the drawing mode, and causes the display apparatus to operate in the selected mode.

2. The display apparatus according to claim 1,
wherein the connection section connects the display apparatus to an image supplying apparatus that supplies the display apparatus with image data, and
the control section transmits the produced image position information to the image supplying apparatus in the second operation mode.

3. A display apparatus that displays an image on a display surface, the display apparatus comprising:
a connection section that connects the display apparatus to other display apparatus;
a display section that displays a partial image that forms at least part of the image in a first display area of the display surface;
a detection section that detects an operation performed on the display surface with a pointing element;
a position information generating section that generates position information representing a position in the first display area where the operation detected by the detection section has been performed;
a control section that produces a drawn object based on the position information generated by the position information generating section and causes the display section to display both the produced drawn object and the partial image in the first display area,
wherein the control section switches an operation mode of the display apparatus between a first operation mode in which the position information is transmitted to the other display apparatus via the connection section and a second operation mode in which the position information is converted into image position information representing a position in the image displayed on the display surface and causes the display apparatus to operate in the selected mode;
a first path that connects the position information generating section to the connection section;
a second path that connects the position information generating section to an input side of the control section and connects an output side of the control section to the connection section; and
a switch circuit that sets a path that connects the position information generating section to the connection section to be the first or second path,
wherein the control section causes the switch circuit to set the path to be the first path in a case where the operation mode is the first operation mode.

4. The display apparatus according to claim 3,
wherein the control section causes the switch circuit to set the path to be the second path in a case where the operation mode is the second operation mode, and when the control section receives, from the other display apparatus, the position information representing an operation position in a second display area where the other display apparatus displays the partial image on the display surface, the control section converts the received position information into the image position information.

5. The display apparatus according to claim 4,
wherein the control section converts the position information into the image position information based on information representing a range of the first display area, information representing a range of the second display area, and a positional relationship between the first display area and the second display area on the display surface.

6. The display apparatus according to claim 4,
wherein the control section switches the operation mode to the first or second operation mode based on a positional relationship between the first display area and the second display area on the display surface.

7. A display apparatus that displays an image on a display surface, the display apparatus comprising:
a connection section that connects the display apparatus to other display apparatus;
a display section that displays a partial image that forms at least part of the image in a first display area of the display surface;
a detection section that detects an operation performed on the display surface with a pointing element;
a position information generating section that generates position information representing a position in the first display area where the operation detected by the detection section has been performed; and
a control section that produces a drawn object based on the position information generated by the position information generating section and causes the display section to display both the produced drawn object and the partial image in the first display area,
wherein the control section switches an operation mode of the display apparatus between a first operation mode in which the position information is transmitted to the other display apparatus via the connection section and a second operation mode in which the position information is converted into image position information representing a position in the image displayed on the display surface and causes the display apparatus to operate in the selected mode, wherein the connection section includes a first connection section that connects the display apparatus to a first display apparatus as the other display apparatus and a second connection section that connects the display apparatus to a second display apparatus as the other display apparatus, wherein the display apparatus includes:
- a third path that connects the first connection section to the second connection section,
- a fourth path that connects the first connection section to an input side of the control section and connects an output side of the control section to the second connection section, and
- a switch circuit that sets a path that connects the first connection section to the second connection section to be the third or fourth path, and wherein the control section causes the switch circuit to set the path to be the third path and transmits information received from the first display apparatus to the second connection section along the third path in a case where the operation mode is the first operation mode.

8. A method for controlling a display apparatus including a connection section, the method comprising:

connecting, via a connection section, the display apparatus to another display apparatus;

displaying a partial image that forms at least part of an image displayed on a display surface in a first display area of the display surface;

detecting an operation performed on the display surface with a pointing element;

generating position information representing a position in the first display area where the detected operation has been performed, the display apparatus and the other display apparatus connected thereto displaying an image on the display surface;

switching a first process of transmitting the generated position information to the other display apparatus via the connection section to a second process of converting the position information into image position information representing a position in the image displayed on the display surface or switching the second process to the first process and carrying out the selected process, and transmitting the generated position information to the connection section in the first process;

producing a drawn object based on the generated position information that is based on the detected operation;

switching a drawing mode in which the produced drawn object is displayed along with the partial image in the first display area to an operation notification mode in which the position information is transmitted to the other display apparatus or switching the operation notification mode to the drawing mode; and causing the display apparatus to operate in the selected mode.

* * * * *